US007024035B1

(12) United States Patent
Enomoto

(10) Patent No.: US 7,024,035 B1
(45) Date of Patent: Apr. 4, 2006

(54) METHOD OF SETTING REGION TO BE SUBJECTED TO RED EYE CORRECTION AND RED EYE CORRECTING METHOD

(75) Inventor: Jun Enomoto, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 662 days.

(21) Appl. No.: 09/657,641

(22) Filed: Sep. 7, 2000

(30) Foreign Application Priority Data

Sep. 7, 1999  (JP) ............................... H11-252772

(51) Int. Cl.
*G06K 9/00* (2006.01)

(52) U.S. Cl. ...................................... 382/167; 382/175
(58) Field of Classification Search ................ 382/167, 382/117, 275; 358/518, 520
See application file for complete search history.

(56) References Cited

U.S. PATENT DOCUMENTS

| 5,048,103 | A | * | 9/1991 | Leclerc et al. ............... 382/294 |
| 5,432,863 | A | * | 7/1995 | Benati et al. ................ 382/167 |
| 5,986,642 | A | * | 11/1999 | Ueda et al. .................. 345/600 |
| 6,009,209 | A | * | 12/1999 | Acker et al. ................. 358/520 |
| 6,204,858 | B1 | * | 3/2001 | Gupta ......................... 382/167 |
| 6,210,048 | B1 | * | 4/2001 | Tanaka et al. ............... 396/418 |
| 6,407,777 | B1 | * | 6/2002 | DeLuca ....................... 348/576 |

FOREIGN PATENT DOCUMENTS

| JP | 5-19382 | 1/1993 |
| JP | 10-75374 | 3/1998 |
| JP | 11-73499 | 3/1999 |

OTHER PUBLICATIONS

Patent Abstracts of Japan 05019382A Jan. 29, 1993.
Patent Abstracts of Japan 11073499A Mar. 16, 1999.
Patent Abstracts of Japan 10075374 Mar. 17, 1998.

* cited by examiner

*Primary Examiner*—Vikkram Bali
*Assistant Examiner*—Colin LaRose
(74) *Attorney, Agent, or Firm*—Sughrue Mion, PLLC

(57) ABSTRACT

The method sets a region to be subjected to red eye correction for red eye designation when a red eye in an image that has been produced in shooting is corrected into an eye having a pupil of a specified color. This setting method automatically extracts only the red eye from a first region including the red eye which has preliminarily been designated by an operator or automatically and sets a second region to be subjected to red eye correction for correcting a color of the pupil into the specified color of the pupil. If only the red eye can not automatically be extracted, the setting method sets the second region by designating only the red eye by the operator manually. The red eye correcting method converts the second region thus set by the above setting method into the eye having the pupil of said specified color to correct the red eye. Therefore, the setting method and the red eye correcting method are capable of greatly enhancing the operative efficiency and the quality of the image subjected to red eye correction.

37 Claims, 9 Drawing Sheets

80 BOX IN RECTANGULAR SHAPE ENCLOSING REGION INCLUDING SURROUNDING REGION OF ONE EYE

82 CENTER OF ONE EYE

METHOD OF SETTING REGION TO BE SUBJECTED TO RED EYE CORRECTION AND RED EYE CORRECTING METHOD

BACKGROUND OF THE INVENTION

The present invention relates to a method of setting a region to be subjected to red eye correction for correcting a red eye in an image which has been produced in shooting and a red eye correcting method of correcting the thus set region to be subjected to red eye correction into the eye having a pupil of a specified color.

When a human individual is taken by a camera from the front particularly at night using an electronic flash, there is a case that a pupil appears in a deep red or gold color, namely, a red eye phenomenon occurs.

Such a red eye phenomenon is generated by allowing light of the electronic flash to be incident on an eye from the front the pupil of which is in an open state in a dark place, specularly reflected therein and then by recording the resultant state in the image. The red eye phenomenon includes occurrences of the red eye in which the pupil thereof is captured in red and a golden eye in which the pupil thereof is captured in gold (both eyes are hereinafter referred to as "red eye" as a whole).

To deal with the above-described problem, for the purpose of decreasing a degree of an opening of the pupil which causes the red eye, a camera having a function which permits the electronic flash to preliminarily emit light before shooting and then shoots with the electronic flash has been developed. However, such a camera can not fully prevent the occurrence of the red eye and has a serious problem such that the occurrence of the red eye is not fully prevented, complexion of the human individual becomes unnatural with the preliminary emission of light, a special mechanism is required for preliminarily emitting light or the like.

In recent years, various methods for preventing the occurrence of the red eye by digital image processing have been proposed.

For example, Unexamined Published Japanese Patent Application (kokai) No. 5-19382 discloses a photoprinter which performs a red eye correcting method that obtains image data by performing photometry on different points in an original image, designates a red eye region, converts the red eye region to that having a pupil of a specified color and prints the original image on a color paper based on the resultant converted data.

Further, Unexamined Published Japanese Patent Application (kokai) No. 11-73499 discloses a method of adjusting color in digital images in which pixels of a digital image having original color data corresponding to predetermined color and shape characteristics are identified and the original color data of the identified pixels are adjusted to achieve a desired result.

Moreover, commonly assigned Unexamined Published Japanese Patent Application (kokai) No. 10-75374 discloses a red eye extracting method in which an eye region is extracted from a region including an eye designated by an operator and then is evaluated whether it is the red eye or not from hue and chroma in the thus extracted eye region; specifically, a region having hue within a specified range of red color and chroma over a specified value is evaluated as the red eye, as well as a red eye correcting method in which chroma of the eye region evaluated as the red eye is decreased.

However, in the above-described patent application No. 11-73499, the red eye region can not always be identified or, when it is wrongly identified, the red eye correction is not appropriately performed; while, in the above-described patent application No. 5-19382, a method of evaluating and correcting the red eye in a manual way or in an automatic way instead of the manual way is disclosed, but the method is not performed by a combination of both ways thereby leaving room for improvement in operative efficiency.

Moreover, in the patent application No. 10-75374, a specific method of extracting and correcting the red eye is disclosed; however, there is a premise therein that the red eye is automatically extracted so that, when an eye region extraction or a red eye evaluation is not perfectly performed, operations need be repeated from the beginning and otherwise thereby causing a problem that the method is not necessarily of a good efficiency as an overall image processing operation or photographic printing operation.

SUMMARY OF THE INVENTION

The present invention has been accomplished under these circumstances and has as an object providing a method of setting a region to be subjected to red eye correction and a red eye correcting method which are capable of efficiently setting the region to be subjected to red eye correction for correcting the red eye as well as enhancing the quality of the image which has been subjected to red eye correction.

In order to attain the object described above, the first aspect of the present invention provides a method of setting a region to be subjected to red eye correction in which a red eye in an image that has been produced in shooting is corrected into an eye having a pupil of a specified color, comprising the steps of: automatically extracting only the red eye from a first region including the red eye which has preliminarily been designated by an operator or automatically; setting a second region to be subjected to red eye correction for correcting a color of the pupil into the specified color of the pupil; and, if only the red eye can not automatically be extracted, setting the second region to be subjected to red eye correction by designating only the red eye by the operator manually.

Preferably, the first region is at least one of an image frame, a face, an eye and an eye surrounding.

Preferably, the image frame is designated as the first region using shooting information.

Preferably, when the eye or the eye surrounding is designated as the first region, at least one of each eye and each pair of eyes can be designated by designating one eye by means of pointing the eye or enclosing the eye with an area in a rectangular shape or by designating the pair of eyes by means of connecting the pair of eyes with a line segment or enclosing the pair of eyes with an area in a rectangular shape.

Preferably, the setting step of the second region is performed on image data which has been subjected to at least one of color adjustment and density correction.

Preferably, when the second region is set, a position of the red eye is roughly designated in a verification screen for determining an image processing condition including at least one of color and density, a display screen is replaced with an output image and thereafter setting the second region is performed.

The second aspect of the present invention provides a red eye correcting method in which a red eye in an image that has been produced in shooting is corrected into an eye having a pupil of a specified color, comprising the steps of: automatically extracting only the red eye from a first region including the red eye which has preliminarily been designated by an operator or automatically; setting a second region to be subjected to red eye correction for correcting a color of the pupil into the specified color of the pupil; and, if only the red eye can not automatically be extracted, setting the second region to be subjected to red eye correction by designating only the red eye by the operator manually; and converting the second region to be subjected to red eye correction thus set into the eye having the pupil of the specified color to correct the red eye.

Preferably, the first region is at least one of an image frame, a face, an eye and an eye surrounding.

Preferably, when the image frame is designated as the first region using shooting information.

Preferably, when the eye or the eye surrounding is designated as the first region, at least one of each eye and each pair of eyes can be designated by designating one eye by means of pointing the eye or enclosing the eye with an area in a rectangular shape or by designating the pair of eyes by means of connecting the pair of eyes with a line segment or enclosing the pair of eyes with an area in a rectangular shape.

Preferably, setting the second region and the red eye correction are performed on image data which has been subjected to at least one of color adjustment and density correction.

Preferably, when the second region is set, a position of the red eye is roughly designated in a verification screen for determining an image processing condition including at least one of color and density, a display screen is replaced with an output image and thereafter setting the second region and the red eye correction is performed.

Preferably, when the image shot as a color image is outputted as a monochrome image, setting the second region and the red eye correction are performed on the color image and thereafter the color image is converted into the monochrome image.

Preferably, the setting of the second region or red eye designation by setting the second region is performed on first image data while the red eye correction is performed on second image data based on a result of the setting of the second region or the red eye designation on the first image data.

Preferably, a bit number of the first image data is smaller than that of the second image data.

Preferably, resolution of the first image data is lower than that of the second image data.

Preferably, an image size of the first image data is smaller than that of the second image data.

Preferably, the first image data is image data of a partial image of an image represented by the second image data.

Preferably, the first image data is produced from the second image data.

Preferably, the first image data is prescanned image data whereas the second image data is fine scanned image data.

Preferably, when the red eye designation is performed on the first image data and the red eye correction is performed on the second image data, the result of the red eye designation is reserved separately from the first image data and thereafter utilized for the second image data.

Preferably, red eye designation information to be used as the result of the red eye designation is at least one of red eye position information and red eye region information.

The term "red eye designation (designating red eye)" as used herein includes designating a red eye itself as well as designating a region including the red eye; the term "setting red eye correcting region" as used herein denotes setting or designating a region of a pupil of the red eye; the term "red eye extraction (extracting red eye)" as used herein denotes extracting the region of the pupil of the red eye manually or automatically; and the term "red eye correction (correcting red eye)" as used herein denotes correcting manually or automatically the region of the pupil of the red eye, namely the region of the pupil of the red eye which has been extracted by the "red eye extraction."

DETAILED DESCRIPTION OF THE INVENTION

A method of setting a region to be subjected to red eye correction and a red eye correcting method according to the present invention are now described in detail with reference to the preferred embodiments shown in the accompanying drawings.

Figure 1:
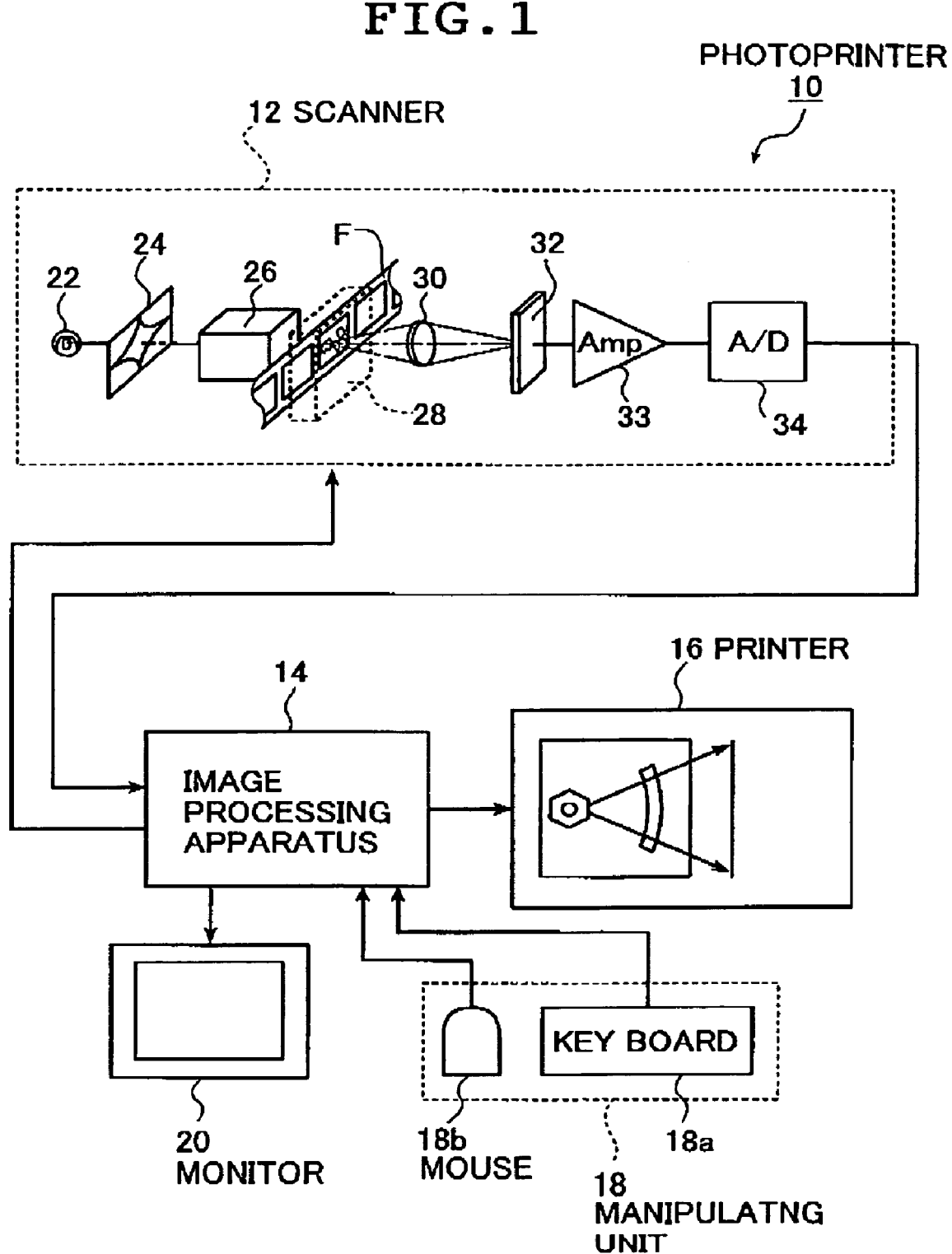
FIG. 1 is a block diagram schematically showing an embodiment of a digital photoprinter which performs image processing including a method of setting a region to be subjected to red eye correction and a red eye correcting method according to the present invention.

FIG. 1 is a block diagram showing an embodiment of a digital photoprinter which performs a method of setting a region to be subjected to red eye-correction according to the present invention and a red eye correcting method according to the present invention.

The digital photoprinter (hereinafter referred to simply as "photoprinter") 10 shown in FIG. 1 comprises a scanner (image reading apparatus) 12 for photoelectrically reading the image recorded on a film F, an image processing apparatus 14 which performs the method of setting the region to be subjected to red eye correction, the red eye correcting method according to the present invention and various types of image processing on the image data (image information) read by the scanner 12 and with which the photoprinter 10 as a whole is manipulated and controlled, and a printer 16 which performs image wise exposure of a light-sensitive material (photographic paper) with light beams modulated in accordance with the image data delivered from the image processing apparatus 14 and which performs development and other necessary processing to produce a (finished) print.

Connected to the image processing apparatus 14 are a manipulating unit 18 having a keyboard 18*a* and a mouse 18*b* for inputting and setting various conditions, selecting and commanding a specific processing step and entering a command and so forth for performing the method of setting the region to be subjected to red eye correction for correcting the red eye and the red eye correcting method, as well as a monitor 20 for representing the image captured with the scanner 12, various manipulative commands and screens for setting and registering various conditions.

The scanner 12 is an apparatus with which the images recorded on the film F are read photoelectrically frame by frame. It comprises a light source 22, a variable diaphragm 24, a diffuser box 26 which diffuses the reading light incident on the film F so that it becomes uniform across a plane of the film F, a carrier 28 for the film F, an imaging lens unit 30, an image sensor 32 having three line CCD sensors corresponding to reading respective color image densities of R (red), G (green) and B (blue) images, an amplifier (Amp) 33 and an A/D (analog/digital) converter 34.

In the photoprinter 10, dedicated carriers 28 are available that can be loaded into the housing of the scanner 12 in accordance with the type of the film used (e.g. whether it is a film of Advanced Photo System (APS) or a negative or reversal film of 135 size), the format of the film (e.g. whether it is a strip or a slide) or other factor. By replacing one carrier 28 with another, the photoprinter 10 can be adapted to process various kinds of films in various modes. The images (frames) that are recorded on the film and which are subjected to the necessary procedure for print production are transported to and held in a specified reading position by means of the carriers 28.

As known well, a magnetic recording medium is formed on the film of the Advanced Photo System; a cartridge ID, the type of film and the like are recorded in the magnetic recording medium; moreover, various kinds of data such a photographing date, a film developing date, the types of a camera, a film developing apparatus and the like which are obtained at the time of shooting or developing can be recorded. The carrier 28 for the film (cartridge) of the Advanced Photo System is provided with a device for reading the magnetic information; thus, when the film is transported to a reading position, the magnetic information are read and various types of information thus read are sent to the image processing apparatus 14.

The scanner 12 captures the images recorded on the film F in the following manner; the reading light from the light source 22 has its quantity adjusted and made-uniform by means of the variable diaphragm 24 and the diffuser box 26 and is then incident on the film F held in the specified reading position by means of the carrier 28 and thereafter passes through the film to produce projected light bearing the image recorded on the film F.

It should be noted that color image signals are not limited to those which are inputted by capturing the light that passes through the film in such a way as described above, but an image on a reflection original or an image taken by the digital camera may be utilized.

The illustrated carrier 28 is adapted to handle the lengthy film F (strips) of 135 size with 24 frames, APS (or their cartridge) or the like. The carrier 28 transports the film F with its length being parallel to the auxiliary scanning direction which is perpendicular to the main scanning direction, that is, the direction in which, for example, three line CCD sensors of R, G and B in the image sensor 32 extend, as the film F is held in registry with the specified reading position. Being held in registry with the reading position, the film F is transported in the auxiliary scanning direction by means of the carrier 28 as it is illuminated with the reading light. Consequently, the film F is subjected to two-dimensional slit scan with the reading light passing through a slit (not shown) extending in the main scanning direction, whereupon the image of each frame recorded on the film F is captured.

The projected light of the film F is focused by the imaging lens unit 30 to form a sharp image on the light-receiving plane of the image sensor 32.

The image sensor 32 is so-called color CCD sensors of three lines comprising, for example, a line CCD sensor for reading an R image, another line CCD sensor for reading a G image, and the other line CCD sensor for reading a B image. As already mentioned, the respective line CCD sensors extend in the main scanning direction. The projected light from the film F is separated into three primary colors R, G and B and then captured photoelectrically by means of the image sensor 32.

Respective output signals of R, G and B outputted from the image sensor 32 are amplified by the Amp 33 and sent to the A/D converter 34 in which respective signals thus sent are converted into, for example, 12-bit R, G and B digital image data and outputted to the image processing apparatus 14.

In the scanner 12, the images recorded on the film F are captured by two scans, the first being prescan (a first image reading) at low resolution and the second being fine scan (a second image reading) for obtaining output image data.

Prescan is performed under preset reading conditions that ensure that all images on the film to be handled by the scanner 12 can be read without saturating the image sensor 32.

Fine scan uses the prescanned data and is performed under reading conditions that are set for each frame such that the image sensor 32 is saturated at a slightly lower density than the minimum density of the image (frame) of interest. The output image signals for prescan and fine scan are essentially the same image data except for resolution and output image signal levels.

It should be noted that the scanner 12 to be used in the photoprinter 10 is by no means limited to a type that relies upon the slit scan technique described above but that it may be of a type that relies upon areal exposure, or a technique by which the image in one frame is scanned across at a time.

In this alternative approach, an area sensor, such as an area CD sensor or the like, may be used with devices of inserting respective R, G and B color filters between the light source 22 and the film F. Respective color filters of R, G and B are sequentially inserted in a light path of the projected light from the light source 22; the reading light which has passed through each of the color filters illuminates an entire surface of the film F; then the light which has passed through the film F is focused on the area CCD sensor to capture the entire image recorded on the film. Since the image capturing is performed by sequentially changing the respective color filters of R, G and B, the image recorded on the film F is captured as it is separated into three primary colors.

As already described, the digital image signals to be outputted from the scanner 12 are fed into the image processing apparatus 14.

Figure 2:
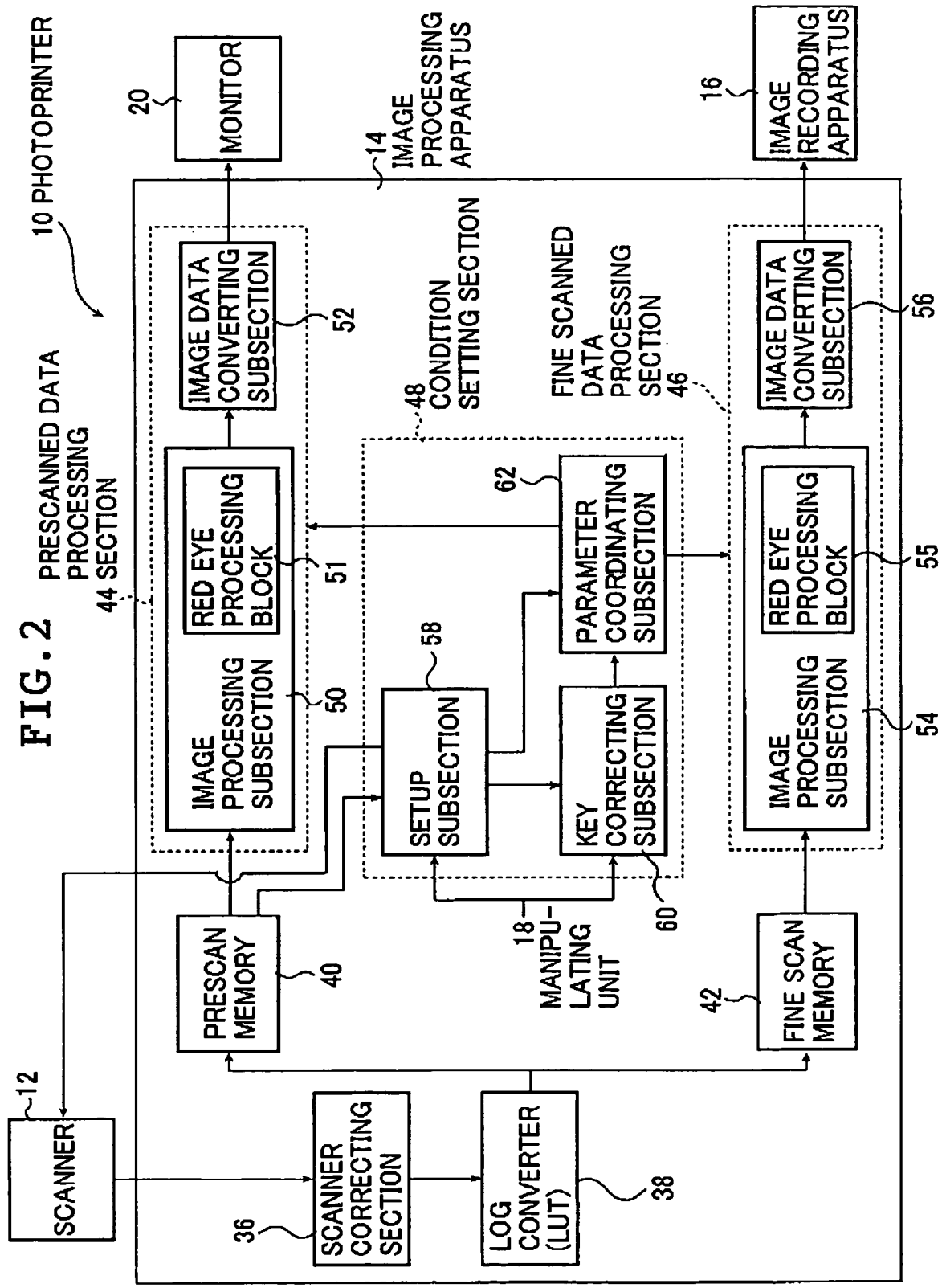
FIG. 2 is a block diagram schematically showing an embodiment of an image processing apparatus shown in FIG. 1.

FIG. 2 is a block diagram of the image processing apparatus (hereinafter referred to simply as "processing apparatus") 14. The processing apparatus 14, which is an apparatus for performing the method of setting the region to be subjected to red eye correction and the red eye correcting method according to the present invention, comprises a scanner correcting section 36, a log converter 38, a prescan (frame) memory 40, a fine scan (frame) memory 42, a prescanned data processing section 44, a fine scanned data processing section 46 for performing various image processing and a condition setting section 48.

FIG. 2 shows only the sites related to image processing and besides these sites, the processing apparatus 14 includes a CPU for controlling and managing the overall operation of the photoprinter 10 including the processing apparatus 14, memories for storing the information necessary for the operation and otherwise of the photoprinter 10. The manipulating unit 18 and the monitor 20 are connected to related sites via the CPU and the like (CPU bus).

R, G and B image signals, for example, 12-bit digital image data, inputted from the scanner 12 to the processing apparatus 14, are fed to the scanner correcting section 36.

The scanner correcting section 36 performs data correction of the read image data such as DC offset correction, dark correction, defective pixel correction, shading correction and the like so as to correct sensitivity dispersion and dark current for each pixel of R, G and B digital image data which are to be caused by the three line CCD sensors of the image sensor 32 of the scanner 12. The digital image signals which have been subjected to correction processing or otherwise of sensitivity dispersion and dark current for each pixel are transferred into the log converter 38.

The log converter 38, which converts the digital image data gradation wise into digital image density data by means of logarithmic conversion processing, for example, converts 12-bit digital image data that has been corrected in the scanner correcting section 36 using a look-up table (LUT) into, for example, 10-bit (0-1023) digital image density data.

Prescanned data and fine scanned data of the digital image density data which have been converted by the log converter 38 are stored in the prescan memory 40 and the fine scan memory 42, respectively.

The prescan memory 40 is a frame memory which stores for each of R, G and B colors the image density data of low resolution in an entire frame of the film F which have been obtained by prescanning the film F by the scanner 12, subjected to various data correction and logarithmic conversion processing. It should be noted that the prescan memory 40 is required to have enough capacity to store the image density data of three R, G and B colors of at least one frame of the film F and that it may have capacity to store the image density data of a plurality of frames or it may have a multiplicity of memories each of which has a storing capacity for one frame.

The prescanned image data stored in the prescan memory 40 is read into the prescanned data processing section 44.

Whereas, the fine scan memory 42 is a frame memory which stores for each of R, G and B colors the image density data of high resolution in an entire frame of the film F which have been obtained by fine scanning the film F by the scanner 12, subjected to various data correction and logarithmic conversion processing. Preferably, the fine scan memory 42 has enough capacity to store the image density data of at least two frames of the film F for each of R, G and B colors; while it writes the image density data for one frame, it reads the image density data for the other frame to permit various image processing to be simultaneously performed in the fine scanned data processing section 46. However, it may have capacity to store the image density data for one frame and performs processing frame by frame or have a multiplicity of memories each of which has a storing capacity for one frame to be utilized, for example, as a toggle memory.

The fine scanned image data stored in the fine scan memory 42 is read into the fine scanned data processing section 46.

The prescan data processing section 44 where the prescanned image data stored in the prescan memory 40 is subjected to various image processing necessary for being represented on the monitor 20 comprises an image processing subsection 50 that has a red eye processing block 51 which performs the method of setting the region to be subjected to red eye correction and the red eye correcting method according to the present invention, and an image data converting subsection 52.

The image processing subsection 50 not only performs specified image processing such as gradation correction, color conversion, density conversion and the like on the image data which has been captured by the scanner 12 and then stored in the prescan memory 40 by means of a look-up table (hereinafter represented by LUT) and a matrix (hereinafter represented by MTX) operation in accordance with an image processing condition set by a condition setting section 48 to be described below such that a color image can be reproduced in a CRT display screen with a desired quality on the monitor 20 to be described below but also performs red eye correction processing to be described below by the red eye processing block 51 to produce image data having a desired display quality such that the pupil portion has been corrected to have a natural color.

The image data converting subsection 52 optionally thins out the image data processed by the image processing subsection 50 so as to meet the resolution of the monitor 20 and similarly converts the image data with a 3D (three-dimensional) LUT or the like into image data that corresponds to the display on the monitor 20 and that is subsequently displayed on the monitor 20.

A processing condition to be adopted in the image processing subsection 50 is set in the condition setting section 48 which is described below.

On the other hand, the fine scanned data processing section 46 where the fine scanned image data stored in the fine scan memory 42 is subjected to various image processing necessary for being outputted as a color print from the image recording apparatus 16 comprises an image processing subsection 54 that has a red eye processing block 55 which performs the method of setting the region to be subjected to red eye correction and the red eye correcting method according to the present invention, and an image data converting subsection 56.

The image processing subsection 54 performs specified image processing on the image data which has been captured by the scanner 12 and then stored in the fine scan memory 42 to allow the image to be reproduced on a color paper with desired density, gradation and color tone as a color print. To achieve such reproduction, the image processing subsection 54 not only performs various image processing such as color balance adjustment, gradation adjustment, color adjustment, density adjustment, chroma adjustment, electronic magnification, sharpening (edge enhancement, sharpness correction) and the like on the image data by means of LUT, MTX operations, a low-pass filter, adder and the like but also, though described in detail below, corrects the pupil portion which has been turned into red in color to that having a natural color thereby producing image data for print production.

The image data converting subsection 56 converts the image data processed by the image processing subsection 54 with a look-up table of reference gradation such as a 3D-LUT or the like into image data that corresponds to image recording with the image recording apparatus 16 and that is subsequently supplied into the image recording apparatus 16.

The image recording apparatus 16 is an apparatus for outputting a finished print in which a color image is reproduced based on the image data outputted from the fine scanned data processing section 46.

A processing condition in the image processing subsection 54 is set in the condition setting section 48.

The condition setting section 48 sets various types of processing conditions in the fine scanned data processing section 46. The condition setting section 48 comprises a setup subsection 58, a key correcting subsection 60 and a parameter coordinating subsection 62.

The setup subsection 58 uses the prescanned image data or the like to set the reading condition for fine scan and supplies it to the scanner 12; in addition, the setup subsection 58 constructs (or calculates) the image processing conditions of the prescanned data processing section 44 and the fine scanned data processing section 46 and supplies them to the parameter coordinating subsection 62.

Specifically, the setup subsection 58 reads the prescanned image data from the prescan memory 40 and uses it to construct a density histogram and calculates image characteristic quantities such as average density, LATD (large area transmission density), highlight (minimum density), shadow (maximum density) and the like. Being based on the thus calculated image characteristic quantities, the reading conditions of fine scan such as light quantity of the light source 22, a stop-down value of the variable diaphragm 24, a storage time of the image sensor 32 and the like are set such that the image sensor 32 is saturated at a slightly lower density than the minimum density of the image of interest.

It should be noted that the reading conditions of fine scan may be changed from those of prescan in all factors in correspondence with an output level of the image sensor, in any one of the factors described above such as the stop-down value or in any plurality of factors such as the stop-down value, the storage time and the like.

Moreover, the setup subsection 58 sets the image processing conditions such as the above-described color balance adjustment, gradation adjustment and the like in accordance with the density histogram, the image characteristic quantities and an operator's command that is optionally entered. Preferably, the image processing conditions include at least one of color and density.

The key correcting subsection 60 calculates adjustment amounts (such as correction amount of LUT or the like) of the image processing conditions in accordance with the adjustment amounts of density (brightness), color, contrast, sharpness, chroma and the like which have been set by keys (not shown) provided in the keyboard 18a or in the manipulating unit 18 or in response to various types of commands entered by the mouse 18b or the like and sets parameters to supply them to the parameter coordinating subsection 62.

After receiving the image processing conditions set by the setup subsection 58, the parameter coordinating subsection 62 sets the thus received image processing conditions in the image processing subsection 50 of the prescanned data processing section 44 and the image processing subsection 54 of the fine scanned data processing section 46; further, in accordance with the adjustment amounts calculated by the key correcting subsection 60, the parameter coordinating subsection 62 corrects (adjusts) the image processing conditions set in various parts or sets the image processing conditions anew.

In the image processing subsection 50 of the prescanned data processing section 44 and the image processing subsection 54 of the fine scanned data processing section 46, red eye processing blocks 51 and 52 are provided, respectively, for correcting the pupil portion which has been turned into red in color to that having a natural color after various types of the above-described processing operations have been performed.

Now the red eye correction processing by the above-described red eye correcting blocks 51 and 55, namely, the method of setting the region to be subjected to the red eye correction and the red eye correcting method according to the present invention will be described in detail.

Figure 3:
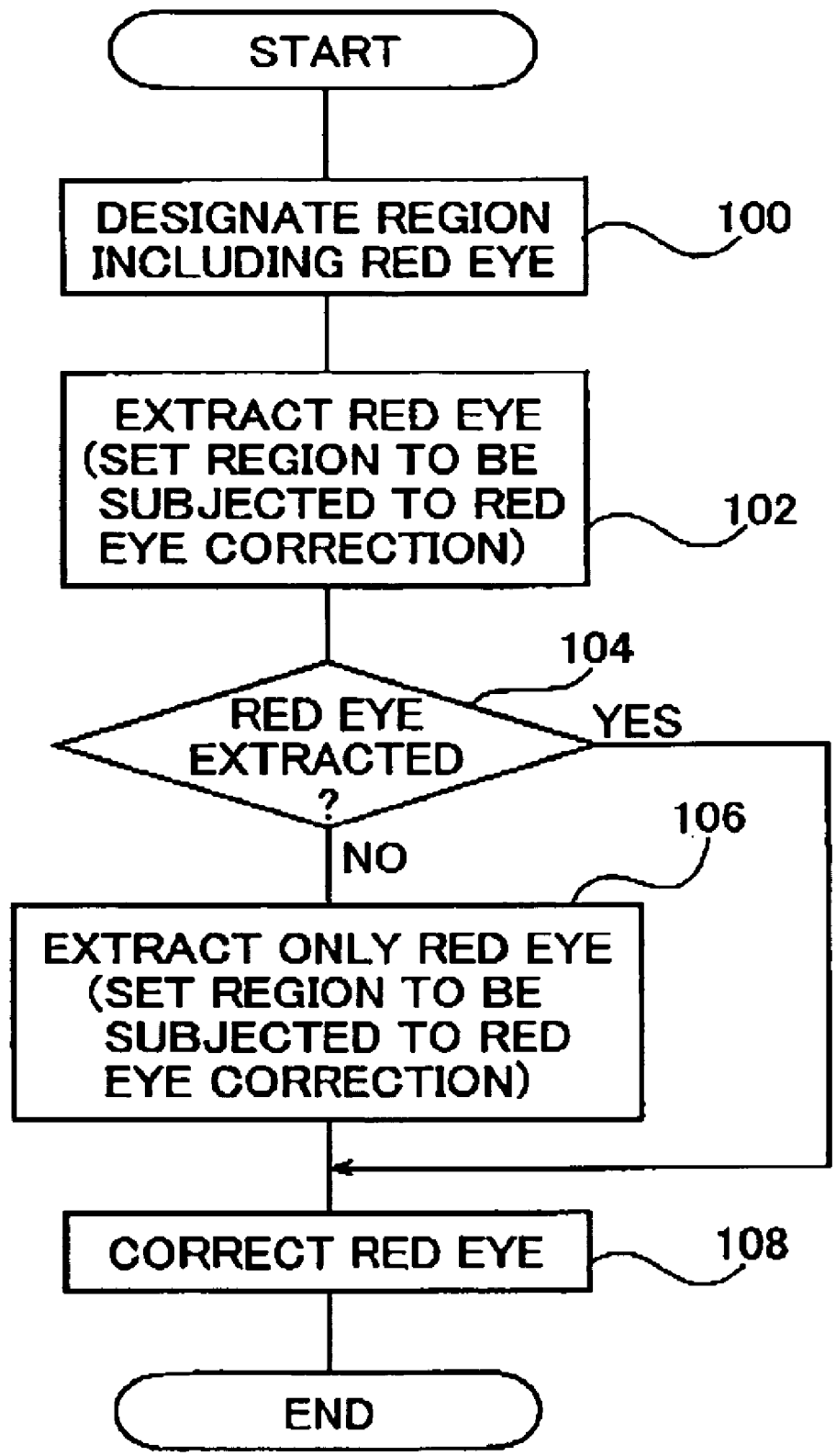
FIG. 3 is a flowchart schematically showing an example of a first red eye correcting method according to the present invention.

To begin with, a first red eye correction processing will be described with reference to a flowchart shown in FIG. 3.

Figure 4:
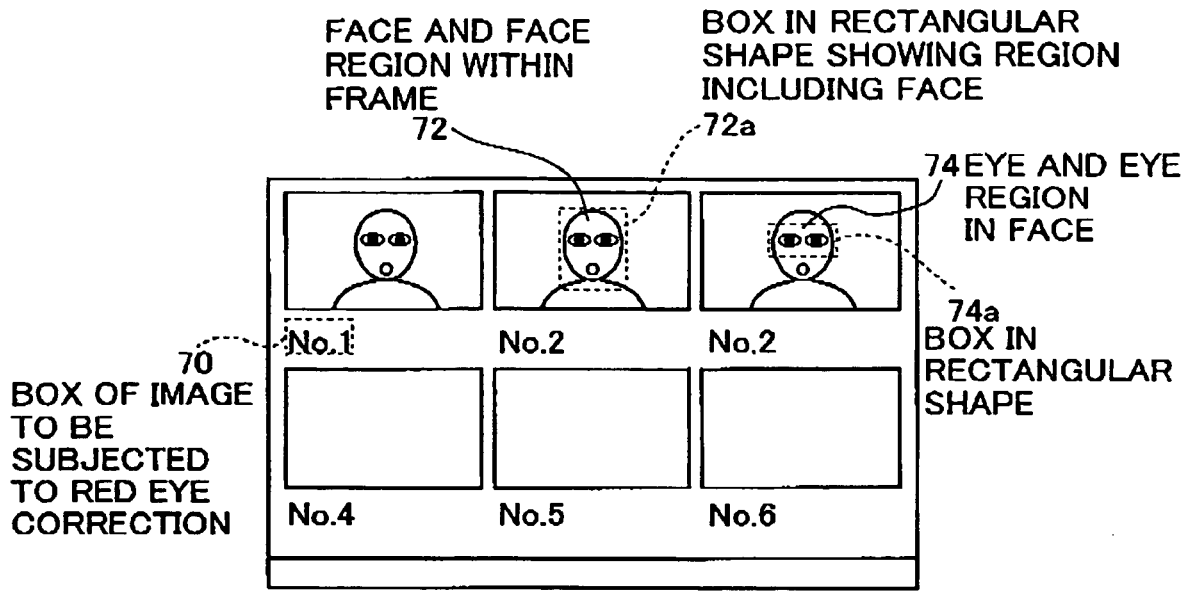
FIG. 4 illustrates an example of a verification screen for designating a region including a red eye according to the present invention.

In a step 100, an image displayed on the monitor 20 is verified; a region including a red eye is designated within the image in a verification screen which has been subjected to various adjustments or correction processing such as color adjustment, density correction or the like. FIG. 4 is an illustration of an example of the verification screen. However, it should be noted that the verification screen is not limited to a representation of 6 frames as shown in the figure, but the representation of one frame or the representation of a plurality of frames except 6 frames may be permissible. Designation of the region including the red eye according to the present embodiment is performed by operator's input by means of the keyboard 18a or mouse 18b of the manipulating unit 18, a touch panel (not shown) or the like. As shown in FIG. 4, methods of designating the region including the red eye contain a method of designating a frame 70 of an image to be subjected to red eye correction, a method of designating a face or a face region 72 in the frame and a method of designating an eye, an eye region 74 or a region surrounding the eye.

The method of designating the frame (scene) or the frame itself can designate it by selecting a number of the frame as shown in FIG. 4 or by directly pointing to inside the region of the frame. When light emission of an electronic flash took place, there exists a high possibility of occurrence of the red eye; hence designation of the frame of interest can be performed by using shooting information as to whether or not light emission of the electronic flash has taken place or the like. To take an example, as described above, various types of shooting information can be recorded in the magnetic information of the film of APS so that the frame in which there is a possibility of occurrence of the red eye can be selected by using the information on presence or absence of light emission of the electronic flash. The method of designating the face region can enclose a region including a face by a frame 72a in a rectangular shape to designate the region 72 within the frame 72a as the face region or designate a portion of the face by means of the mouse 18b or the like. The method of designating the eye region, as shown in FIG. 4, can enclose a region 74 including a pair of eyes and the surrounding region thereof by a frame 74a in a rectangular shape to designate the region 74 within the frame 74a as the eye region. When the face region or eye region is designated, it may be permissible to designate it by directly pointing the region including the face or the eye. It should be noted that the frame of the image to be subjected to red eye correction is by no means limited to the frame in the film but the scene or the frame of the image taken by the digital or still camera may of course be permissible.

Secondly, in a step 102, a red eye extraction is automatically performed to set a region to be subjected to red eye correction.

Such a method of performing the red eye extraction is not limited to any particular type, but known methods described below are also applicable. For example, a specified characteristic quantity for each pixel in each region designated above is calculated; then, an image is split regionwise by each region in which the characteristic quantity described above forms a peak; then, each of a shape, relationship of arrangement (positions) with another region, an area ratio, a density, an average color tint on each of the thus split regions is checked; then a region which has characteristics of the pupil portion most among others is selected as the region to be subjected to red eye correction and set as such. If a plurality of regions have been selected in a first image as regions to be subjected to red eye correction, then each of the shape, relationship of dispositions (positions) with another region, the area ratio, the density and the average color tint of each of regions is evaluated and thereafter a region with the highest evaluation is selected as the region to be subjected to red eye correction.

As the method of evaluation, for example, for each split region, first points are obtained such that as the degree of roundness is higher, the point becomes higher; then the region with the highest point has the characteristics of the pupil portion most among others; thus it is designated as the region to be subjected to red eye correction. As another method, for each split region, a distance between a position of gravity and a position of a center of the designated region is calculated; then second points are obtained such that as the distance is shorter, the point becomes higher; then the region with the highest point has the characteristics of the pupil portion most among others; thus it is designated as the region to be subjected to red eye correction.

Further, as the other method, for each split region, a ratio between each area of the split regions and an area of the designated region is obtained; then third points are obtained such that as the thus obtained ratio is more apart from a specified range such as a range of the ratio between the area of the pupil portion previously obtained and the area of the specified region or the like, the point becomes smaller; then the region with the highest point has the characteristics of the pupil portion most among others; thus it is designated as the region to be subjected to red eye correction.

Furthermore, fourth points are obtained such that at least any one of an average value, a maximal value, a minimal value, contrast and a histogram shape of at least any one of hue, chroma and brightness is compared with information of a region of statistic color tonal defect which has previously been measured and as a point has characteristics closer to those of the region of statistic color tonal defect, the point becomes higher; then the region with the highest point has the characteristics of the pupil portion most among others; thus it is designated as the region to be subjected to red eye correction.

Next, in a step 104, red eye extraction, namely, whether the region to be subjected to red eye correction has been set or not is judged. As a result, when the red eye was able to be extracted, processing advances to a step 108; when the red eye was unable to be extracted, the operator designates only the red eye manually to set the region to be subjected to red eye correction in the step 106 and then the processing advances to the step 108. In this case, if the red eye was unable to be corrected or the result of the red eye extraction was not considered to be correct, it is preferable that the mode of designation is automatically changed into a manual mode. If it is found that the picture taking has been performed with an electronic flash, there exists a high possibility of occurrence of the red eye whereupon information of light emission of the electronic flash is magnetically or optically recorded on the side of a camera or a film with lens; then, upon obtaining the information the red eye may be searched.

Setting the region to be subjected to red eye correction by designating only the red eye by the operator is performed in a manner as described below.

Figure 5A:
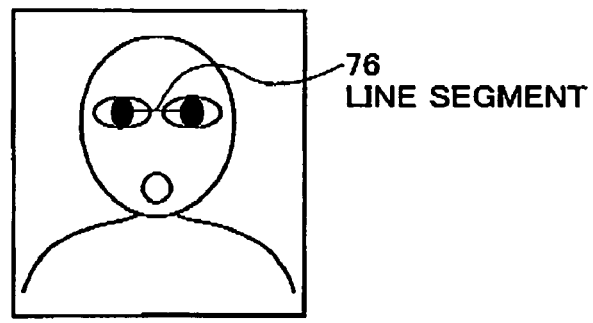
FIGS. 5A and 5B illustrate respective examples of a method of designating a pair of eyes according to the present invention.

Take an example, as shown in FIG. 5A, centers of pupils of a pair of eyes are designated by the keyboard 18a or the mouse 18b of the manipulating unit 18 or the like and then a pair of eyes are connected by a line segment 76 to designate the pair of eyes. In this case, a region of ellipse one half the length of the long axis of which becomes a length in a specified ratio from each end of the line segment 76 connecting the centers of pupils of the designated pair of eyes is designated as the region for each eye and set as the region to be processed, namely, to be subjected to red eye correction.

Figure 5B:
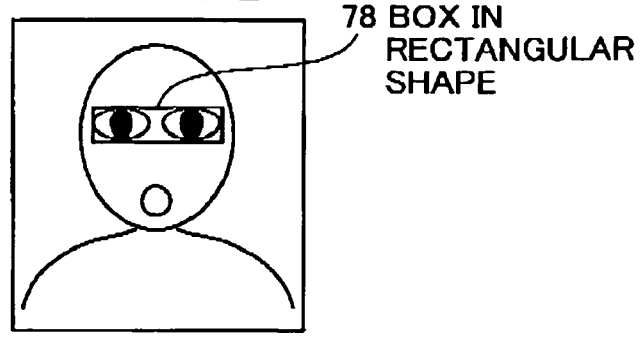

Alternatively, as shown in FIG. 5B, a region having a pair of eyes and surrounding regions thereof are enclosed by a frame 78 in a rectangular shape by means of the keyboard 18a or the mouse 18b of the manipulating unit 18 and the region in the frame 78 is designated and set as the region to be processed, namely, to be subjected to red eye correction.

In either of the above-described cases, an arrangement is made such that a region between eyes (glabellae) is excluded by using a ratio of statistically calculated size of the eye. When a pair of eyes are designated, the pair of eyes are designated all together whereupon work efficiency for setting the region to be subjected to red eye correction, namely, work efficiency for correcting the red eye, can be enhanced.

It should be noted that designating the red eye or setting the region to be subjected to red eye correction is not only performed for a pair of eyes all together but may also be performed for each eye.

Figure 6A:
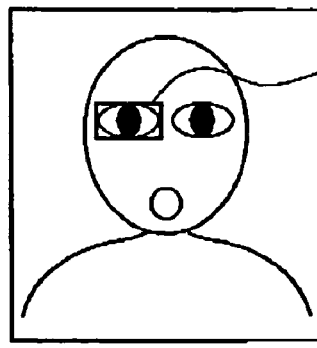
FIGS. 6A and 6B illustrate respective examples of a method of designating one eye according to the present invention.
Figure 6B:
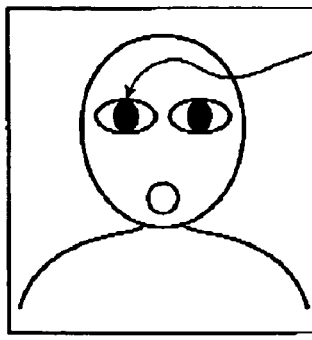

For example, as shown in FIG. 6A, the region having one eye and the surrounding region thereof is enclosed and designated by a frame 80 in a rectangular shape by means of the keyboard 18a or mouse 18b of the manipulating unit 18 to set the region within the frame 80 as the region to be processed, namely, to be subjected to red eye correction. Alternatively, as shown in FIG. 6B, the center 82 of an eye is pointed and designated to set the region to be subjected to red eye correction.

It should be noted that the designating method and setting method are not limited to embodiments described above, but other designating methods and setting methods are of course permissible. For example, it is permissible that a region having an eye and the surrounding thereof is enclosed in the same way as in a drawing drawn by hand by means of the keyboard 18a or mouse 18b of the manipulating unit 18 and is designated as the region to be processed thereby setting the region to be subjected to red eye correction.

Next, in a step 109, red eye correction is performed.

Figure 7:
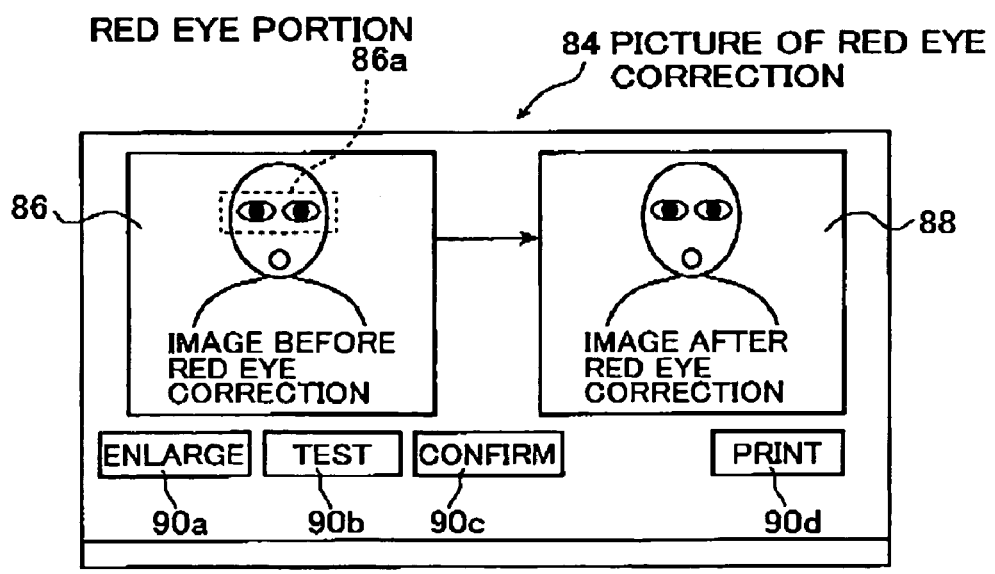
FIG. 7 illustrates an example of a screen for performing red eye correction according to the present invention.

The red eye correction is performed on the fine scanned image. Setting the region to be subjected to red eye correction by designating the red eye and correcting the red eye are performed in a way as described below on the fine scanned image which has been subjected to various adjustments and corrections by the image processing condition set in the setup subsection 58 as a result of verification of the prescanned image. FIG. 7 illustrates an example of a screen for performing red eye correction. A red eye correction screen 84 displays an image 86 before red eye correction and an image 88 after the red eye correction side by side whereupon the operator performs the red eye correction looking at the red eye correction screen 84.

The operator pressed down an enlargement button 90a to enlarge the image and then designates the red eye portion 86a. Next, by pressing down a test button 90b, the thus designated red eye portion 86a is subjected to red eye correction. Namely, when the test button 90b is pressed down, the color of the red eye portion 86a is changed to a predetermined color (for example, black color) and represented as the image 88 after the red eye correction. If the operator judges, while looking at the display screen, that the correction result is favorable, then the operator presses down a confirmation button 90c. With this step, the red eye correction is finalized whereupon if the operator presses down a print button 90d, the image which has been subjected to red eye correction is outputted as a print.

If there exist a plurality of red eyes, processing operations from designating the red eye till establishing it are repeated for each red eye. However, it is of course permissible also in this case first to designate the plurality of red eyes and in a last step to establish the thus designated red eyes all together.

It should be noted that the processing of red eye correction according to the present invention is not limited to the above-described embodiments but known processing of red eye correction can be employed. For example, a method described in commonly invented Unexamined Published Japanese Patent Application No. 10-75374 is exemplified. In this method, an eye region is extracted from a region having an eye designated by the operator, for example, only digital image data of the eye region is precisely extracted from digital image data of the region having the eye based on continuity of pixels with low brightness or the like; then, red eye judgment of the eye region is performed; then, if the red eye region is judged as the red eye, processing to eliminate the red eye is performed such that, for example, if the eye is a black eye originally, chroma of the eye region is decreased to allow it to come close to achromatic color thereby performing correction into a black eye, whereas, for example, if the eye is a blue eye originally, a desired tint of blue color which has previously been designated and stored is used for hue transformation thereby performing correction into a blue eye.

In the above-described method, judgment as to whether the eye region is the red eye or not is to judge that the region is the red eye if, for example, the eye region has a hue within a specified range of red color as well as chroma over a specified value. Namely, the red eye judgment can be performed if only a hue range and a chroma threshold value of the eye region are set. For example, digital image data of R, G and B images are converted to colorimetry values of L*a*b* color system and then respective average values of hue and chroma of the eye region are calculated using the following operations whereupon, in case of $H_1 \leq H \leq H_2$ and $C \geq C_{th}$, the region is judged as the red eye:

$H(\text{hue}) = \tan^{-1}(b^*/a^*)$ $C(\text{chroma}) = \sqrt{(a^{*2} + b^{*2})}$ wherein $M_1$ and $H_2$ represent respective hue ranges of red; and $C_{th}$ represents a threshold value of chroma.

Figure 8:
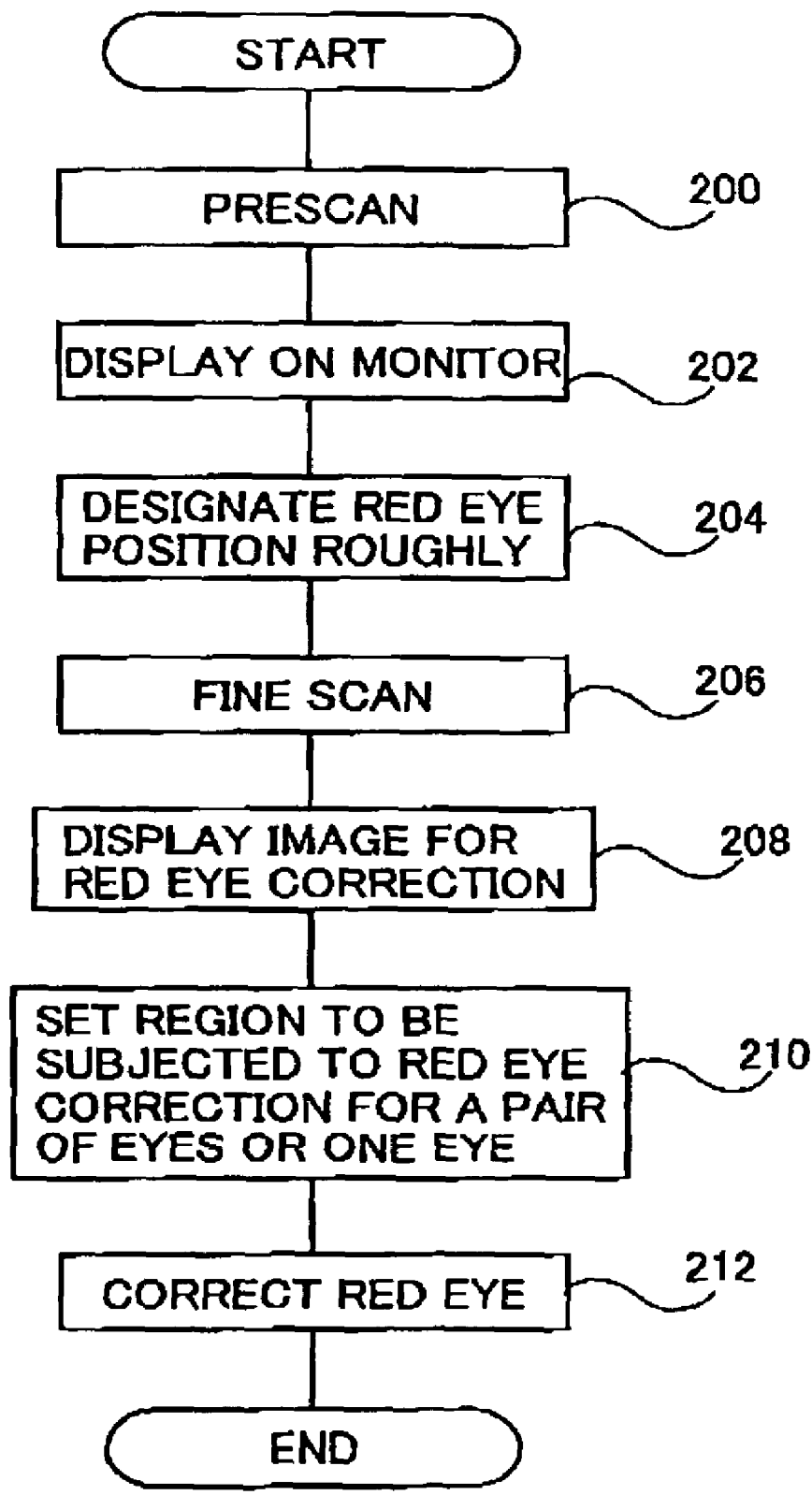
FIG. 8 is a flowchart schematically showing an example of a second red eye correcting method according to the present invention.

Next, the second red eye correction processing is described with reference to a flowchart in FIG. 8.

In a step 200, prescan is performed; in a subsequent step 202, the thus prescanned image is represented on the monitor 20, is verified and is subjected to various adjustment processing or correction processing to set an image processing condition. In a subsequent step 204, a position of the red eye is roughly designated in the thus verified prescanned image in the same manner as described before.

In a subsequent step 206, fine scan is performed, a fine scanned image at a high resolution is captured; in a step 208, the fine scanned image which has been subjected to various adjustment or correction processing set in the above is displayed on the monitor 20 as a red eye correction image by replacing the prescanned image which is being displayed on the monitor 20. In a step 210, the image is enlarged to set the region to be subjected to red eye correction for a pair of eyes or one eye. In this setting, since the position of the red eye has roughly been set in the prescanned image, if the fine scanned image is enlarged while placing the thus set position in the center and then displayed, it is even easier to set the region to be subjected to red eye correction.

In a subsequent step 212, red eye correction is performed in the same way as in the first red eye correction processing described above.

In the above-described embodiment, though the position of the red eye has roughly been designated in the prescanned image, fine scanned image may be employed from the beginning. By this employment, though the processing speed becomes a little slower, precision of setting the region to be subjected to red eye correction and correcting the red eye is enhanced.

In the case of the digital still camera, an image for output (print, media) is used from the beginning. In this case, the image (data) for output which has been reduced or thinned out may be used.

Further, when the position of the red eye has been designated, it is preferably that enlargement processing is performed while placing the position in the center.

Figure 9:
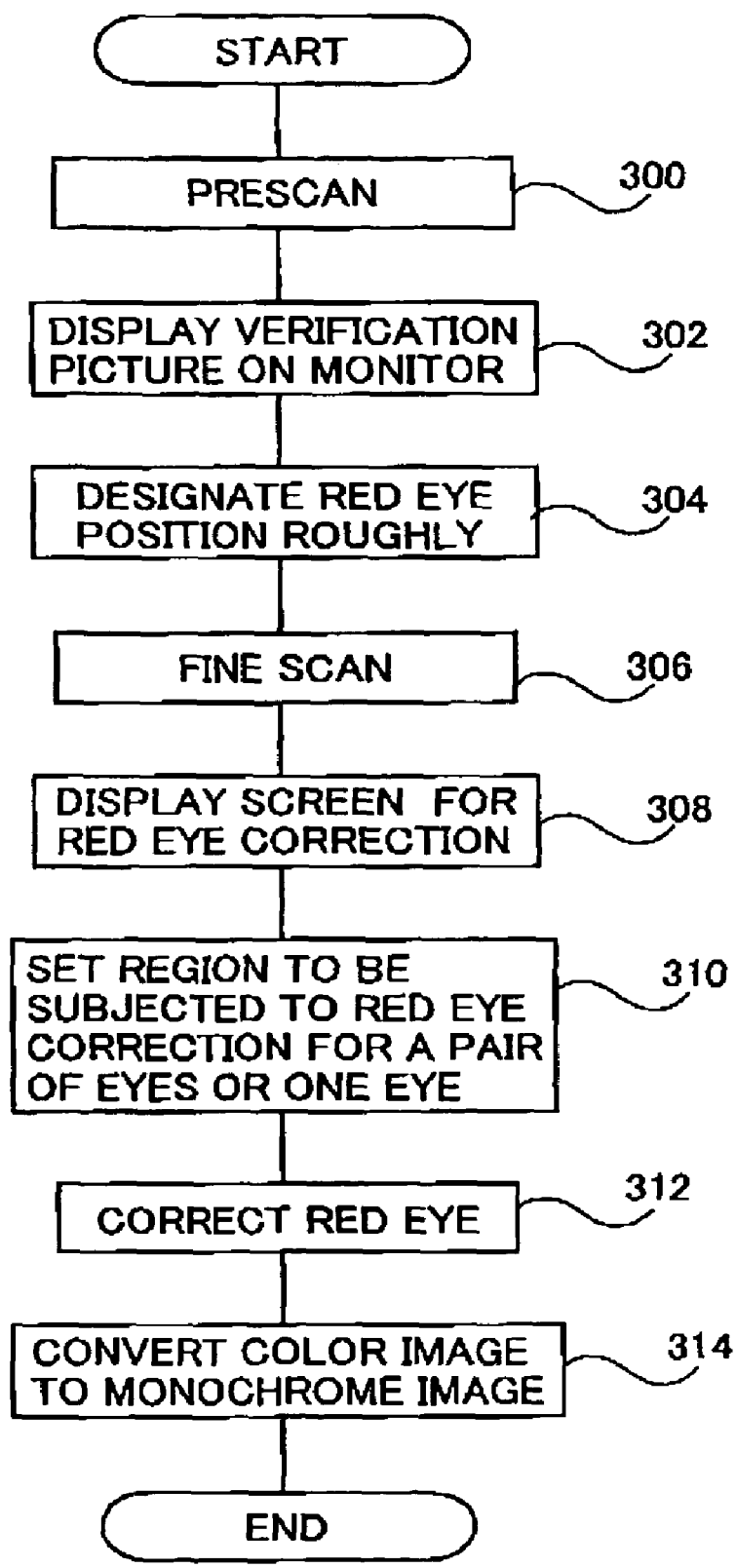
FIG. 9 is a flowchart schematically showing an example of third red eye correcting method according to the present invention.

Next, the third red eye correction processing is described with reference to a flowchart in FIG. 9. This is the case in which a monochrome image (black-and-white, sepia) is produced from a color negative film. Therefore, this case is nearly the same as in the above-described second red eye correction processing except only for converting the color image into the monochrome image after the red eye correction has been performed.

In a step 300, prescan is performed; in a subsequent step 302, various adjustment or correction processing are performed on the thus prescanned image to display a verification screen on the monitor 20; in a subsequent step 304, a position of the red eye is roughly designated in the same way as described before; in a subsequent step 306, fine scan is performed; in a step 308, a fine scanned image is displayed in a screen for red eye correction on the monitor 20 by replacing the prescanned image thereon; in a step 310, the image is enlarged and displayed to set a region to be subjected to red eye correction for a pair of eyes or one eye. As described above, works for designating the red eye and setting a region to be subjected to red eye correction are performed on the color image; in this case, the color image has been employed due to the easiness of extracting the red eye therefrom.

In a step 312, the red eye correction is performed on the color image in the same way as in the above-described second red eye correction processing; in a subsequent step 314, the color image is converted into monochrome image.

Figure 10:
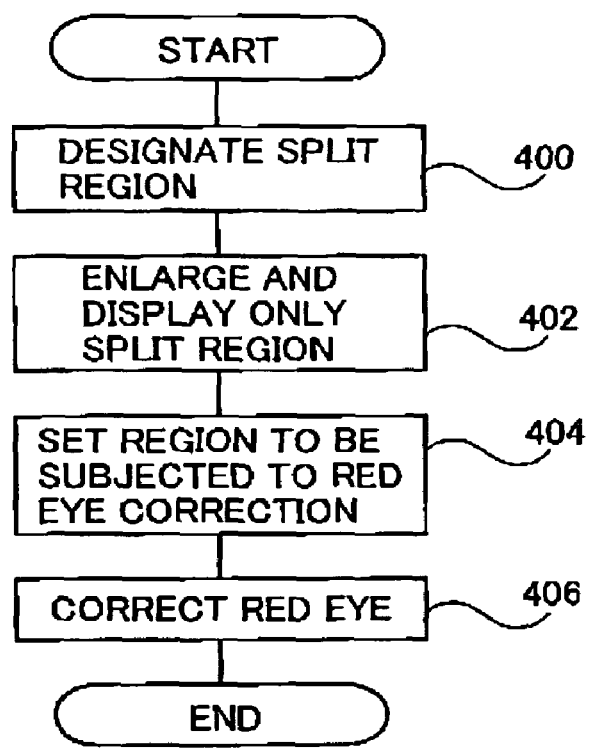
FIG. 10 is a flowchart schematically showing an example of a fourth red eye correcting method according to the present invention.

Next, the fourth red eye correction processing is described with reference to a flowchart in FIG. 10.

This is a method of setting a region to be subjected to red eye correction other than the method of setting the region to be subjected to red eye correction through designating a scene, a face or an eye.

Figure 11:
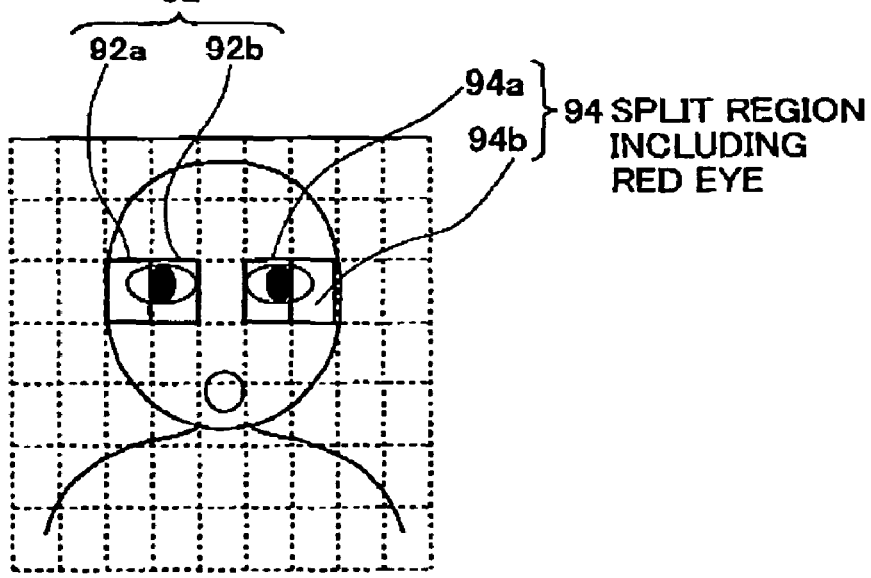
FIG. 11 illustrates an example of a method of designating a red eye by means of a split region designation according to the present invention.

In a step 400, as shown in FIG. 11, an image is split to designate a split region; in a step 402, the split region is enlarged and displayed to designate split regions 92 and 94 each including a red eye; in this case, when the eye extends in two or more split regions (blocks), all the regions (92a and 92b, as well as 94a and 94b in FIG. 11) are designated; in a step 404, a region to be subjected to red eye correction is set from the split regions having the red eye thus designated; in a step 406, the red eye correction processing as described above is performed on the thus set region to be subjected to red eye correction.

According to the present invention, as described above, it is preferable that the red eye designation is performed on the first image data such as the prescanned image data while the red eye extraction, setting the region to be subjected to red eye correction and the red eye correction are performed on the second image data such as fine scanned image data at a higher resolution based on a result of the red eye designation or information of its designation performed on the first image data. However, both of the former and latter processing may be performed using the same image data.

The first image data to be used for setting the red eye is not limited to image data at a lower resolution than that of the second image data which is used for extracting the red eye, setting the region to be subjected to red eye correction and correcting the red eye, however, other image data with a smaller bit number or image size may be permissible. For example, when the first image data is an 8-bit image data, the second image data may be a 10-bit image data.

Further, the first image data may be image data of a partial image of an image represented by the second image data or be produced from the second image data. For example, when the second image data is the fine scanned image data, the first image data may be the reduced image data, the thinned-out image data or the partially-enlarged image data of the fine scanned image data; alternatively, for example, when the second image data is image data taken by a digital camera, the first image data may be the reduced image data, the thinned-out image data or the partially-enlarged image data of such image data taken by the digital still camera.

According to the present invention, it is preferable that the red eye designation, the red eye extraction, setting the region to be subjected to red eye correction and the red eye correction are performed on image data which has been subjected to at least one of color adjustment and density correction; it is more preferable that the image data has been subjected to the color adjustment for allowing the red eye designation, the red eye extraction, setting of the region to be subjected to red eye correction, the red eye correction and the like to be further appropriately performed, since the accuracy is enhanced in doing so.

Figure 12:
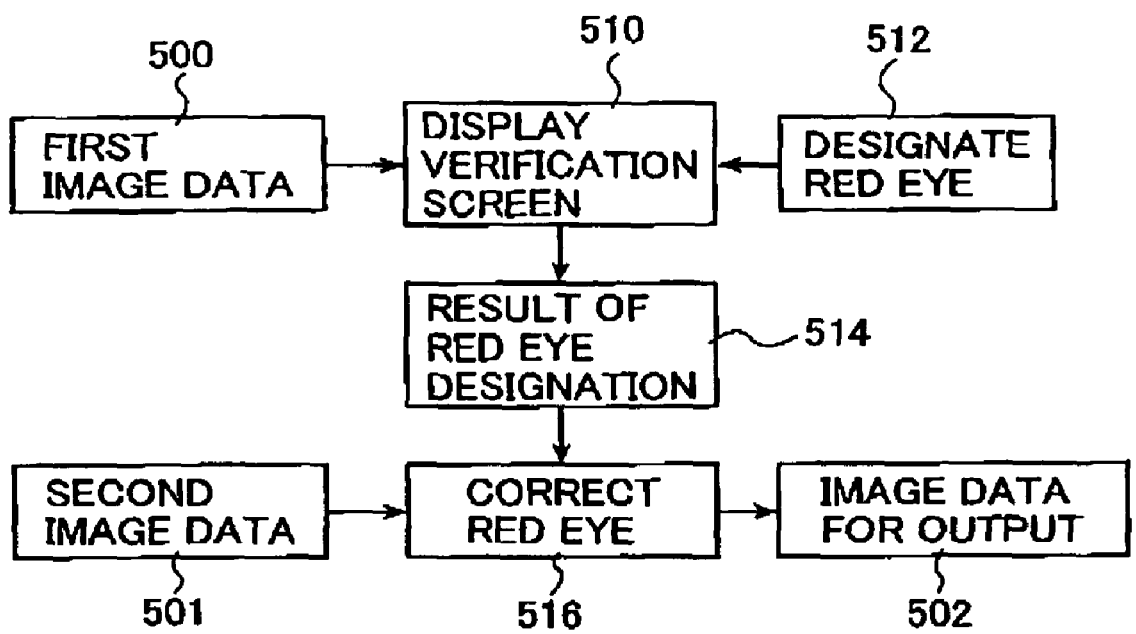
FIG. 12 schematically illustrates another example of a red eye correcting method according to the present invention.

In the present invention, as shown in FIG. 12, a photographed image is displayed or represented in a verification screen on the monitor 20 using a first image data 500 (step 510), red eye correction is performed on the thus displayed image in the verification screen (step 512) and the result (red eye designation result) is kept separately from the first image data 500, for example, stored in an internal memory (not shown) or the like (step 514). Preferably, in this case, the red eye designation information to be kept separately from the first image data 500 is at least one of red eye position information and red eye region information (largeness or size thereof).

The obtained red eye designation result kept separately from the first image data 500 is applied to a second image data 501 which is then subjected to red eye extraction and red eye correction (step 516) based on the red eye designation result and outputted as an image data 502 for output. Though not shown in FIG. 12, it is needless to say that the second image data 501 has been subjected to various processing such as image processing, data processing or the like other than the red eye correction processing before or after the red eye correction processing.

According to the method of setting the region to be subjected to red eye correction and the red eye correcting method based on the former method in accordance with the present embodiment as described above, the red eye can be corrected not only in the print of interest but also in an index print, a file print, other prints, or media output (CD-R, ZIP, JAZ or the like). Further preferably, the index print, file print or media output (CD-R, ZIP, JAZ or the like) can previously select whether or not the red eye correction is performed and a result of such selection can be reflected in the red eye correction.

One eye can be designated in a scene having one red eye while a pair of eyes can be designated all together in a scene having a pair of red eyes whereupon red eye correction can be performed all at once. Moreover, even when red eye can not automatically be extracted because it is a golden eye, half-opened eye, narrow eye or the like, the operator can designate the red eye and set the region to be subjected to red eye correction thereby allowing the red eye correction to be surely performed.

As a result, work efficiency is greatly enhanced as well as quality of the image which has been subjected to red eye correction is enhanced.

Moreover, setting the region to be subjected to red eye correction according to the present invention can also be applied when the region to be subjected to red eye correction is set at the time of correcting the red eye image not only recorded on the negative film, reversal film but also taken by the digital camera or the like.

Further, it can be utilized for correcting not only the red eye but also a wrinkle, hurt pimple or the like under a common GUI (graphic user interface) environment.

While the method of setting the region to be subjected to red eye correction and the red eye correcting method according to the present invention have been described above in detail, the foregoing embodiments are not the sole examples of the present invention and various improvements and modifications are of course possible without departing from its spirit and scope.

As described in detail on the foregoing pages, the method of setting the region to be subjected to red eye correction and the red eye correcting method according to the present invention are capable of greatly enhancing the operative efficiency as well as enhancing the quality of the image which has been subjected to red eye correction. In addition, the present invention has excellent effect such that the present invention can be utilized for correcting not only the red eye but also the wrinkle, scar, pimple or the like.

What is claimed is:

1. A method of setting a region to be subjected to red eye correction in which a red eye in an image that has been produced in shooting is corrected into an eye having a pupil of a specified color, comprising the steps of:

automatically extracting only the red eye from a first region including the red eye which has preliminarily been designated by an operator or automatically;

setting a second region to be subjected to red eye correction for correcting a color of the pupil into said specified color of the pupil; and, if only the red eye can not automatically be extracted, setting said second region to be subjected to red eye correction by designating only the red eye by the operator manually, wherein said setting of said second region and said red eye correction are performed on first image data for displaying a first image on a monitor screen, a corrected first image reproduced from said first image data which has been subjected to said red eye correction is displayed on said monitor screen, and then said red eye correction in said corrected first image is verified, and wherein said setting of said second region and said red eye correction are performed on second image data for outputting a print.

2. The method of setting the region to be subjected to red eye correction according to claim 1, wherein the step of automatically extracting further includes prescanning the image to form the first region and fine scanning the image to form the second region.

3. The method of setting the region to be subjected to red eye correction according to claim 2, wherein the step of prescanning the image to form the first region is performed by a scanner device.

4. The method of setting the region to be subjected to red eye correction according to claim 1 further including judging whether the red eye is extracted in the step of automatically extracting.

5. The method of setting the region to be subjected to red eye correction according to claim 4, wherein if the step of judging determines that the red eye is not extracted then carrying out the step of setting said second region to be subjected to red eye correction by designating only the red eye by the operator manually.

6. The method of setting the region to be subjected to red eye correction according to claim 1, wherein said first image data is prescanned image data or image data of low resolution for displaying said first image on said monitor screen, and said second image data is fine scanned image data or image data of high resolution for outputting said print.

7. The method of setting the region to be subjected to red eye correction according to claim 1, wherein said first region is at least one of an image frame, a face, an eye and an eye surrounding.

8. The method of setting the region to be subjected to red eye correction according to claim 7, wherein said image frame is designated as said first region using shooting information.

9. The method of setting the region to be subjected to red eye correction according to claim 8, wherein the shooting information includes information regarding whether a flash is used or not.

10. The method of setting the region to be subjected to red eye correction according to claim 9, wherein the shooting information is determined from a film.

11. The method of setting the region to be subjected to red eye correction according to claim 8, wherein the shooting information is determined from a magnetic recording medium formed on a film.

12. The method of setting the region to be subjected to red eye correction according to claim 7, wherein when the eye or the eye surrounding is designated as said first region, at least one of each eye and each pair of eyes can be designated by designating one eye by means of pointing the eye or enclosing the eye with an area in a rectangular shape or by designating the pair of eyes by means of connecting the pair of eyes with a line segment or enclosing the pair of eyes with an area in a rectangular shape.

13. The method of setting the region to be subjected to red eye correction according to claim 1, wherein the setting step of said second region is performed on image data which has been subjected to at least one of color adjustment and density correction.

14. The method of setting the region to be subjected to red eye correction according to claim 1, wherein when said second region is set, a position of the red eye is roughly designated in a verification screen for determining an image processing condition including at least one of color and density, a display screen is replaced with an output image and thereafter setting said second region is performed.

15. A red eye correcting method in which a red eye in an image that has been produced in shooting is corrected into an eye having a pupil of a specified color, comprising the steps of:

automatically extracting only the red eye from a first region including the red eye which has preliminarily been designated by an operator or automatically;

setting a second region to be subjected to red eye correction for correcting a color of the pupil into said specified color of the pupil; and, if only the red eye can not automatically be extracted, setting said second region to be subjected to red eye correction by designating only the red eye by the operator manually; and converting said second region to be subjected to red eye correction thus set into the eye having the pupil of said specified color to correct the red eye, wherein said setting of said second region and said red eye correction are performed on first image data for displaying a first image on a monitor screen, a corrected first image reproduced from said first image data which has been subjected to said red eye correction is displayed on said monitor screen, and then said red eye correction in said corrected first image is verified, and wherein said setting of said second region and said red eye correction are performed on second image data for outputting a print.

16. The red eye correcting method according to claim 15, wherein the step of automatically extracting further includes prescanning the image to form the first region and fine scanning the image to form the second region.

17. The red eye correcting method according to claim 16 further including displaying the fine scanned image before the step of converting adjacent to the fine scanned image after the step of converting; and receiving a user input selecting one of the fine scanned image before the step of converting and the fine scanned image after the step of converting to output a converted image.

18. The red eye correcting method according to claim 16, wherein the step of prescanning the image to form the first region is performed by a scanner device.

19. The red eye correcting method according to claim 15 further including judging whether the red eye is extracted in the step of automatically extracting.

20. The red eye correcting method according to claim 15, wherein said first region is at least one of an image frame, a face, an eye and an eye surrounding.

21. The red eye correcting method according to claim 20, wherein when the image frame is designated as said first region using shooting information.

22. The red eye correcting method according to claim 20, wherein when the eye or the eye surrounding is designated as said first region, at least one of each eye and each pair of eyes can be designated by designating one eye by means of pointing the eye or enclosing the eye with an area in a rectangular shape or by designating the pair of eyes by means of connecting the pair of eyes with a line segment or enclosing the pair of eyes with an area in a rectangular shape.

23. The red eye correcting method according to claim 15, wherein setting said second region and said red eye correction are performed on image data which has been subjected to at least one of color adjustment and density correction.

24. The red eye correcting method according to claim 15 further including
displaying the image before the step of converting adjacent to an image after the step of converting; and
receiving a user input selecting one of the image before the step of converting and the image after the step of converting to output a converted image.

25. The red eye correcting method according to claim 15, wherein when said second region is set, a position of the red eye is roughly designated in a verification screen for determining an image processing condition including at least one of color and density, a display screen is replaced with an output image and thereafter setting said second region and said red eye correction is performed.

26. The red eye correcting method according to claim 15, wherein said first image data is prescanned image data or image data of low resolution for displaying said first image on said monitor screen, and said second image data is fine scanned image data or image data of high resolution for outputting said print.

27. The red eye correcting method according to claim 15, wherein when said image shot as a color image is outputted as a monochrome image, setting said second region and said red eye correction are performed on the color image and thereafter said the color image is converted into the monochrome image.

28. The red eye correcting method according to claim 15, wherein red eye designation by setting said second region is performed on first image data while said red eye correction is performed on second image data based on a result of said red eye designation on said first image data.

29. The red eye correcting method according to claim 28, wherein a bit number of said first image data is smaller than that of said second image data.

30. The red eye correcting method according to claim 28, wherein both of first image data and second image data are image data of said image having said red eye that has been produced in shooting.

31. The red eye correcting method according to claim 28, wherein resolution of said first image data is lower than that of said second image data.

32. The red eye correcting method according to claim 28, wherein an image size of said first image data is smaller than that of said second image data.

33. The red eye correcting method according to claim 28, wherein said first image data is image data of a partial image of an image represented by said second image data.

34. The red eye correcting method according to claim 28, wherein said first image data is produced from said second image data.

35. The red eye correcting method according to claim 28, wherein said first image data is prescanned image data whereas said second image data is fine scanned image data.

36. The red eye correcting method according to claim 28, wherein when the red eye designation is performed on said first image data and the red eye correction is performed on said second image data, said result of the red eye designation is reserved separately from said first image data and thereafter utilized for said second image data.

37. The red eye correcting method according to claim 28, wherein red eye designation information to be used as said result of the red eye designation is at least one of red eye position information and red eye region information.

* * * * *